United States Patent
Slattery

(10) Patent No.: US 8,316,687 B2
(45) Date of Patent: Nov. 27, 2012

(54) METHOD FOR MAKING A TOOL USED TO MANUFACTURE COMPOSITE PARTS

(75) Inventor: Kevin T. Slattery, St. Charles, MO (US)

(73) Assignee: The Boeing Company, Chicago, IL (US)

(*) Notice: Subject to any disclaimer, the term of this patent is extended or adjusted under 35 U.S.C. 154(b) by 422 days.

(21) Appl. No.: 12/540,301

(22) Filed: Aug. 12, 2009

(65) Prior Publication Data

US 2011/0036139 A1 Feb. 17, 2011

(51) Int. Cl.
*B21C 3/16* (2006.01)
*B21K 5/20* (2006.01)

(52) U.S. Cl. .......................... 72/476; 76/107.1
(58) Field of Classification Search ............ 72/377, 72/464, 476, 413, 462, 481.1; 76/107.1; 228/112.1
See application file for complete search history.

(56) References Cited

U.S. PATENT DOCUMENTS

| | | |
|---|---|---|
| 3,201,967 A | 8/1965 | Balamuth et al. |
| 3,516,274 A | 6/1970 | Graham et al. |
| 3,643,483 A | 2/1972 | Minchenko et al. |
| 4,071,097 A | 1/1978 | Fulop et al. |
| 4,129,027 A | 12/1978 | Ignashev et al. |
| 4,828,052 A | 5/1989 | Duran et al. |
| 5,419,791 A | 5/1995 | Folmer |
| 5,771,729 A | 6/1998 | Bailey et al. |
| 5,826,453 A | 10/1998 | Prevey, III |
| 6,216,508 B1 | 4/2001 | Matsubara et al. |
| 6,532,786 B1 | 3/2003 | Luttgeharm |
| 6,561,002 B2 | 5/2003 | Okada et al. |
| 6,622,570 B1 | 9/2003 | Prevey, III |
| 6,736,729 B2 | 5/2004 | Wang et al. |
| 6,745,609 B2 | 6/2004 | Garnett et al. |
| 6,748,780 B1 | 6/2004 | Luttgeharm |
| 6,764,057 B2 | 7/2004 | Fanucci et al. |
| 6,779,708 B2 | 8/2004 | Slattery |
| 6,823,705 B2 | 11/2004 | Fukuda et al. |
| 6,910,616 B2 | 6/2005 | Halley et al. |
| 6,971,256 B2 | 12/2005 | Okada et al. |
| 7,066,375 B2 * | 6/2006 | Bolser ........................ 228/112.1 |
| 7,079,996 B2 | 7/2006 | Stewart et al. |
| 7,083,076 B2 | 8/2006 | Slattery |
| 7,128,948 B2 | 10/2006 | Slattery |
| 7,156,276 B2 | 1/2007 | Slattery |
| 7,225,967 B2 | 6/2007 | Slattery |
| 7,243,517 B2 | 7/2007 | Sieger |

(Continued)

FOREIGN PATENT DOCUMENTS

WO  WO 2005049298 A1  6/2005

OTHER PUBLICATIONS

English translation of WO 2005/049298, Christodoulou, pp. 1-31.*

(Continued)

*Primary Examiner* — Teresea M Ekiert
(74) *Attorney, Agent, or Firm* — Yee & Associates, P.C.

(57) ABSTRACT

A method is provided for making a composite part layup tool. A surface of a base is shaped and used as a tool to incrementally form a metal sheet. The formed metal sheet is friction plug welded to the shaped surface on the base to form a metal tool surface of the layup tool.

18 Claims, 5 Drawing Sheets

U.S. PATENT DOCUMENTS

| | | | |
|---|---|---|---|
| 7,347,351 B2 | 3/2008 | Slattery | |
| 7,353,978 B2 | 4/2008 | Slattery et al. | |
| 7,381,446 B2 | 6/2008 | Slattery | |
| 7,398,911 B2 | 7/2008 | Slattery et al. | |
| 7,431,194 B2 | 10/2008 | Slattery | |
| 7,479,201 B1 | 1/2009 | Wegner et al. | |
| 7,509,725 B2 | 3/2009 | Huskamp et al. | |
| 7,515,986 B2 | 4/2009 | Huskamp | |
| 7,536,892 B2 | 5/2009 | Amino et al. | |
| 7,607,225 B2 | 10/2009 | Huskamp et al. | |
| 7,669,750 B2 | 3/2010 | Slattery et al. | |
| 7,841,504 B2 | 11/2010 | Slattery et al. | |
| 7,854,363 B2 | 12/2010 | Slattery et al. | |
| 8,033,151 B2 | 10/2011 | Castle et al. | |
| 8,177,113 B2 | 5/2012 | Slattery | |
| 2002/0088549 A1 | 7/2002 | Fanucci et al. | |
| 2003/0154757 A1 | 8/2003 | Fukuda et al. | |
| 2003/0168494 A1 | 9/2003 | Halley et al. | |
| 2004/0004108 A1 | 1/2004 | Halley et al. | |
| 2004/0094604 A1 | 5/2004 | Halley et al. | |
| 2004/0112941 A1 | 6/2004 | Slattery | |
| 2004/0148997 A1 | 8/2004 | Amino et al. | |
| 2005/0084701 A1 | 4/2005 | Slattery | |
| 2005/0127139 A1 | 6/2005 | Slattery et al. | |
| 2005/0127140 A1 | 6/2005 | Slattery | |
| 2006/0016854 A1 | 1/2006 | Slattery | |
| 2006/0037992 A1 | 2/2006 | Slattery | |
| 2006/0059848 A1 | 3/2006 | MacDonald-Schmidt et al. | |
| 2006/0060635 A1 | 3/2006 | Slattery et al. | |
| 2006/0236544 A1 | 10/2006 | Huskamp et al. | |
| 2006/0272378 A1 | 12/2006 | Amino et al. | |
| 2007/0014983 A1 | 1/2007 | Slattery | |
| 2007/0050979 A1 | 3/2007 | Huskamp et al. | |
| 2007/0075121 A1 | 4/2007 | Slattery | |
| 2007/0186507 A1 | 8/2007 | Slattery | |
| 2008/0262659 A1 | 10/2008 | Huskamp | |
| 2008/0276566 A1 | 11/2008 | Slattery et al. | |
| 2008/0277451 A1 | 11/2008 | Slattery et al. | |
| 2009/0250834 A1 | 10/2009 | Huskamp et al. | |
| 2010/0257909 A1 | 10/2010 | Huskamp et al. | |
| 2010/0257910 A1 | 10/2010 | Castle et al. | |

OTHER PUBLICATIONS

English translation of WO 2005/049298 (Jun. 2, 2005), Christodoulou, pp. 1-31.*

Huskamp et al., "Method and Apparatus for Incremental Sheet Forming," USPTO Application No. 12/486,968, filed Jun. 18, 2009, 42 pages.

Lamminen et al., "Incremental Sheet Forming with an Industrial Robot," Materials Forum vol. 29, 2005, pp. 331-335.

Pohlak et al., "Manufacturability and Limitations in Incremental Sheet Forming," Proc. Estonian Acad. Sci. Eng., 2007, vol. 13, No. 2, pp. 129-139.

Young et al., "Method and Apparatus for Incremental Sheet Forming," USPTO U.S. Appl. No. 12/486,960, filed Jun. 18, 2009, 38 pages.

USPTO Office Action, dated Oct. 27, 2010, regarding U.S. Appl. No. 12/062,994, 10 pages.

USPTO Final Office Action, dated Feb. 24, 2011, regarding U.S. Appl. No. 12/062,994, 9 pages.

USPTO Office Action, dated Apr. 6, 2012, regarding U.S. Appl. No. 12/420,433, 25 pages.

USPTO Office Action, dated Apr. 6, 2011, regarding U.S. Appl. No. 12/420,399, 8 pages.

USPTO Notice of Allowance, dated Jun. 21, 2011, regarding U.S. Appl. No. 12/420,399, 8 pages.

Office Action dated Jul. 3, 2012 regarding USPTO U.S. Appl. No. 12/540,301, 13 pages.

Office Action dated Jul. 3, 2012 regarding USTPO U.S. Appl. No. 12/486,968, 20 pages.

* cited by examiner

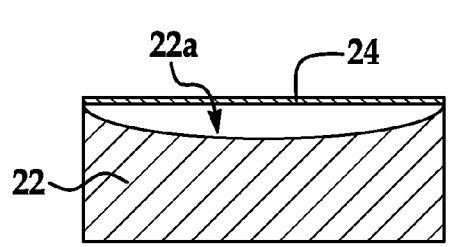
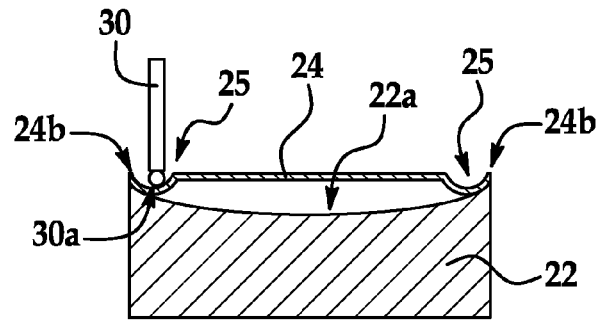
FIG. 7  FIG. 8
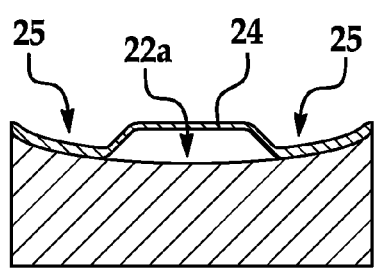
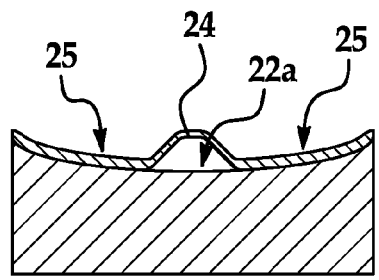
FIG. 9  FIG. 10
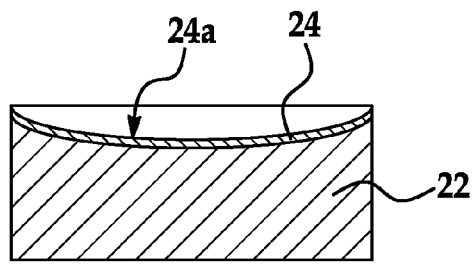
FIG. 11

METHOD FOR MAKING A TOOL USED TO MANUFACTURE COMPOSITE PARTS

TECHNICAL FIELD

This disclosure generally relates to tooling, and deals more particularly with a method for making a tool useful in laying up and/or curing a composite part.

BACKGROUND

A variety of tools may be used to fabricate composite parts, including tools used to layup, form and/or cure ply layups so that the finished parts have a desired shape. In the past, these composite fabrication tools were often made by machining solid blocks of metal such as Invar Ni—Fe alloys that resulted in durable metal tool surfaces. In some cases, these tools were machined from relatively thick solid plates, while in other cases, relatively thin metal plates were machined to the desired shape and then mechanically attached or welded to a backup structure.

The tool manufacturing techniques discussed above were relatively expensive due to material waste, machining time and the need for skilled labor. Also, the setups for the required machining processes were relatively time consuming, resulting in relatively long lead times to produce tooling. Finally, these tools were relatively heavy, making them difficult to move, and required relatively long heat-up and cool-down times due to their relatively high thermal mass.

Accordingly, there is a need for a method of making a tool that may be used to manufacture composite parts that is relatively rapid and inexpensive, and which may reduce tool weight and thermal mass.

SUMMARY

According to a number of the embodiments, a method is provided of making tools useful in fabricating composite parts that may reduce material costs, lead times and tool weight. The tool made by the disclosed method comprises a relatively lightweight base that provides a backing for a relatively thin, lightweight metal sheet having a formed tool surface. The metal tool surface may be shaped by incrementally forming a flat metal sheet using a numerically controlled machine tool. The same machine tool may be used to shape the base to substantially match the shape of the formed metal sheet.

According to one disclosed embodiment, a method is provided of making a tool used in producing a composite part. The method includes shaping a surface on a base to generally match the shape of the part and forming a tool surface by incrementally forming a metal sheet onto the shaped surface of the base. The method is completed by attaching the metal sheet to the base. The attachment process may be carried out by friction plug welding the formed metal sheet to a shaped surface on the base. Shaping the surface on the base may be carried out by a numerically controlled machining process. Incremental forming of the metal sheet may be carried out by placing the metal sheet over the shaped surface of the base, and incrementally deforming parts of the metal sheet against the shaped surface of the base.

According to another disclosed embodiment, a method is provided of making a tool used in forming a composite part layup. A shape is machined into a surface of a base that generally matches the shape into which the composite part layup is to be formed. A metal sheet is placed over the shaped surface of the base and then formed over the shaped surface. The shaped surface on the base may be machined a second time to final dimensions. The formed metal sheet may be placed on the base covering the shaped surface and attached to the base. Shaping of the surface on the base and forming the metal sheet over the shaped surface may be performed by a single numerically controlled machine tool. Forming the metal sheet over the shaped surface of the base may be performed by an incremental forming process. The incremental forming process may include clamping the metal sheet on the base against movement within a plane, and incrementally displacing portions of the metal sheet in a direction generally perpendicular to the plane. The formed metal sheet may be attached to the base by friction plug welding.

Accordingly, the disclosed embodiments satisfy the need for a method of making a tool used to manufacture composite parts that is rapid and may reduce both material costs and lead times for tooling.

BRIEF DESCRIPTION OF THE ILLUSTRATIONS

FIGS. 5-15 are illustrations of sectional views showing processing steps used in a method of making the tool shown in FIG. 1.

DETAILED DESCRIPTION

Figure 1:
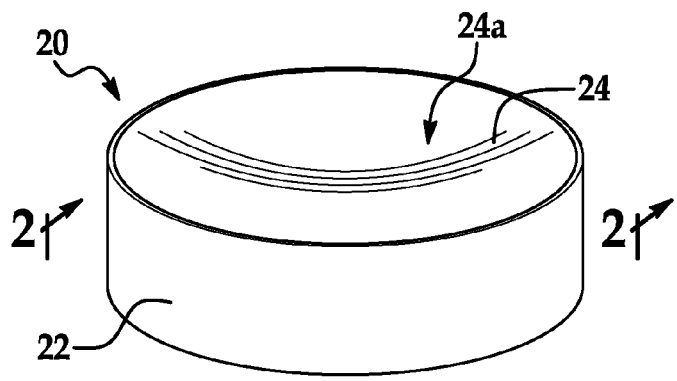
FIG. 1 is an illustration of an isometric view of a tool used in the fabrication of composite parts.
Figure 2:
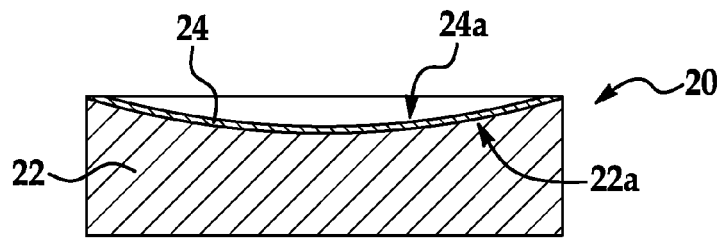
FIG. 2 is an illustration of a sectional view taken along the line 2-2 in FIG. 1.

Referring first to FIGS. 1 and 2, the disclosed embodiments generally relate to a method of making a tool 20 that may be used in the fabrication of parts (not shown), including composite parts. For example, the tool 20 may be used to form a shape into a part layup or blank (not shown), or as a cure tool to support and maintain the shape of a composite part layup during the curing stage. It should be noted here that while the embodiments will be described in connection with a tool 20 useful in fabricating composite parts, the tool 20 may be used to fabricate parts made from a variety of other formable materials, including but not limited to thermoplastic parts. The part formed by the tool 20 may have any three dimensional shape, including simple curves and/or compound curves, and may form either an inner mold line or an outer mold line.

The tool 20 broadly comprises a base 22 having a shaped surface 22a, and a formed metal sheet 24 attached to the base 22. The metal sheet includes an exposed tool surface 24a for supporting and shaping the part layup (not shown) during layup and/or curing stages. As will be discussed below, the metal sheet 24 is formed into a shape that substantially matches the shaped surface 22a of the base 22. While a generally circular base 22 and dome-shaped tool surface 24a are shown in the drawings, these shapes are merely illustrative of a wide range of regular and irregular shapes that are possible. Also, while the tool surface 24a is shown as being concave, this surface may be convex or a combination of concave and convex shapes, depending upon the shape of the composite part to be fabricated.

The metal sheet 24 may comprise any of various metals that are suitable for use as tools and has a thickness that allow it to be incrementally formed into a desired shape using techniques described later in more detail. In one example, the metal sheet 24 may comprise an Invar Ni—Fe alloy. The base 22 may comprise a lightweight material such as a lattice structure formed from a material that is generally the same as that of the metal sheet 24, or a bed of pins (not shown) that may be formed to a desired shape, as by machining.

Figure 3:
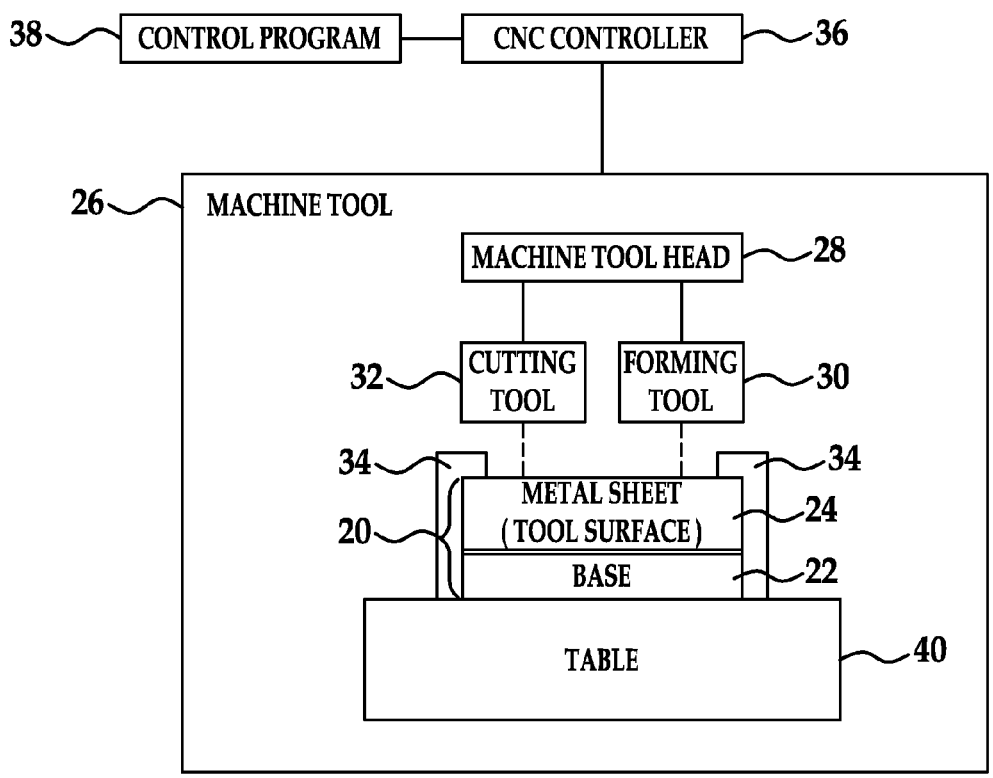
FIG. 3 is an illustration of a block diagram showing equipment used to carryout a method of making the tool shown in FIG. 1.

Attention is now directed to FIG. 3 which broadly illustrates equipment that may be used to make the tool 20. Depending upon the fabrication steps being carried out, one or both of the base 22 and metal sheet 24 may be secured to a machine tool table 40 by clamps 34, or by either friction stir welding or friction plug welding. The table 40 may form part of a machine tool 26 that includes a machine tool head 28. The machine tool head 28 has mounted thereon a cutting tool 32 such as a mill, and a forming tool 30 used to carry out incremental forming of the metal sheet 24. The forming tool 30 may comprise, for example and without limitation, a spherical stylus (not shown) used to incrementally deform portions of the metal sheet 24. The machine tool 26 may be controlled by a CNC (computer numerically controlled) controller 36, or similar numeric controller operated by a control program 38 that controls tool path, and thus the shapes into which the base 22 and metal sheet 24 are formed. While a single machine tool 26 has been shown in the drawings, machining of the base 22 and incremental forming of the metal sheet 24 may be performed by two separate machine tools 26. Additional details of suitable apparatus for carrying out incremental sheet forming of the metal sheet 24 are disclosed in U.S. patent application Ser. No. 12/062,994 filed Apr. 4, 2008, titled "Formed Sheet Composite Tooling", the entire contents of which application are incorporated by reference herein.

Figure 4:
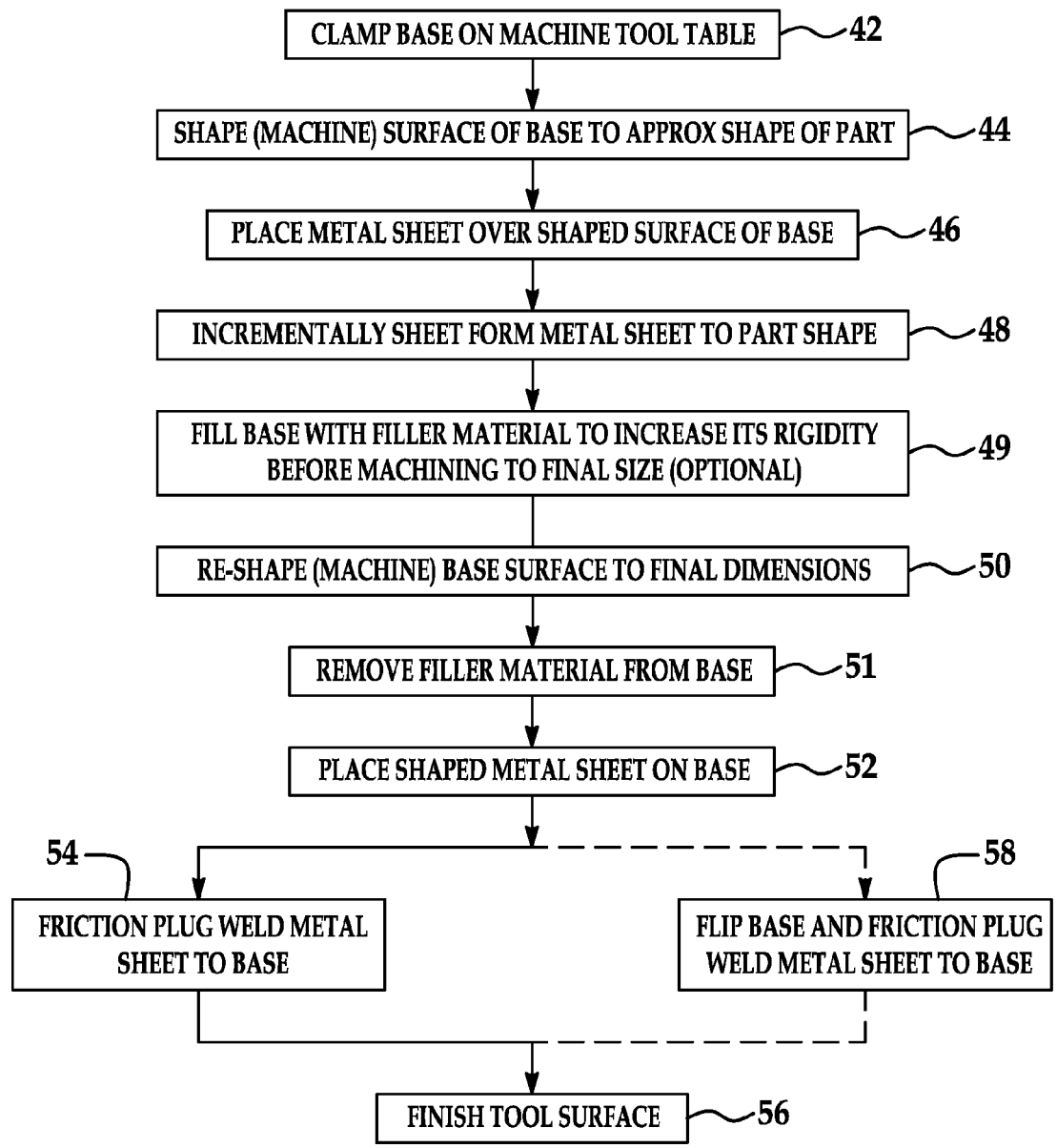
FIG. 4 is an illustration of a flow diagram broadly showing the steps of a method of making a tool according to the disclosed method embodiments.

FIG. 4 broadly illustrates the basic steps of a method of fabricating the tool 20 using equipment similar to that illustrated in FIG. 3. Beginning at step 42, the base 22 is clamped on the machine tool table 40 in preparation for a machining operation. Next at 44, a surface on the base 22 is shaped, as by machining using a cutting tool 32 (FIG. 3) to form a shape that approximates the shape of the composite part to be fabricated by the tool 30 and serves as a tool used to assist in forming the metal sheet 24 to a desired shape. The shape and/or dimensions of the shaped surface 22a (FIG. 2) may be selected to allow for spring-back of the metal sheet 24 and/or other characteristics or variations in the shape of the metal sheet 24.

Next, at step 46, the metal sheet 24 is placed over the shaped surface 22a of the base 22 and is clamped in manner that maintains the edges of the metal 24 sheet substantially in a single plane overlying the shaped surface 22a of the base 22. At step 48, the metal sheet 24 is incrementally formed to a desired shape wherein the tool surface 24a substantially matches the shape of the composite part to be fabricated. During the incremental forming of the metal sheet 24, the forming tool 30 (FIG. 3) is used to incrementally deform portions of the metal sheet 24 down onto the shaped surface 22a of the base 22 in a programmed manner, in a direction that is substantially perpendicular to the plane in which the edges of the sheet 24 are held, as previously described.

At step 49, where the base 22 is formed of a light weight lattice structure that may need to be reinforced before it is reshaped by machining, the base 22 is filled with a filler material such as wax or a structural foam to add rigidity to the base. At step 50, the shaped surface 22a of the base 22 may be reshaped as by machining to a set of final dimensions so that the shape of the base surface 22a substantially matches that of the formed metal sheet 24. Then, where filler material has been previously added to the base 22, the filler material is removed at step 51. Next, at step 52, the formed metal sheet 24 is placed on the base 22. In one embodiment, as shown at step 54, the metal sheet 24 is friction plug welded or friction spot welded to the base 22. Friction plug welding is a known process in which a tapered shape plug (not shown) is friction welded into a tapered hole in a substrate. Other forms of welding and techniques for attachment may be employed, however friction plug welding may be desirable in some applications because of its tendency to eliminate or limit distortion that may occur from other forms of welding, such as fusion welding. Following step 54, the tool surface 24a may be finished as shown at step 56 using machining or other techniques that improve and/or refine the surface finish. Alternatively, following step 52, as shown at step 58, the base 22 may be inverted or flipped, and friction plug welding of the formed metal sheet 24 to the base 22 may be carried out from a side of the base 22 opposite of the tool surface 24a.

Figures 5, 6:
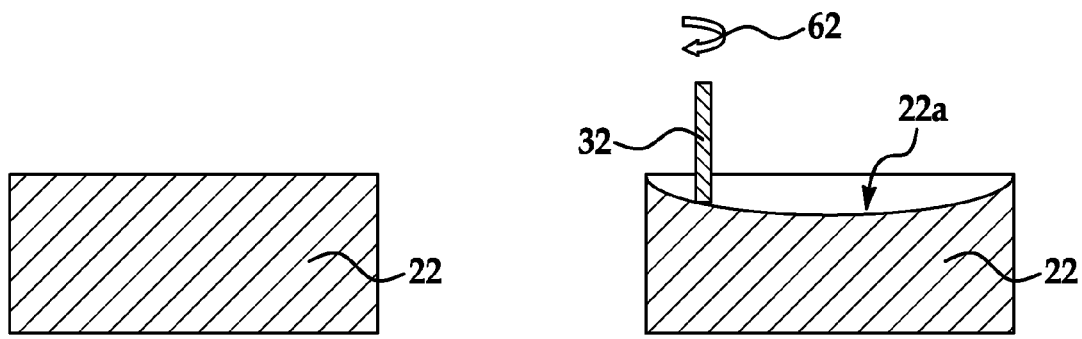

Attention is now directed to FIGS. 5-15 which illustrate additional details of the steps of the method of making the tool 20. The method begins with providing a blank base 22 as shown in FIG. 5 which, as previously described, may comprise a lightweight material such as a lattice structure or a pin bed. Where the lattice structure is formed of relatively thin elements, the structure may be reinforced to provide it with sufficient rigidity required for subsequent machining processes by filling the lattice structure with a reinforcing material that may be later removed. For example, and without limitation, the lattice structure may be filled with a wax or a foam that may be later removed by subjecting the base 22 to elevated temperatures which either melt or combust the filler material. Next, as shown in FIG. 6, a shaped surface 22a of the base is formed into a desired shape by any suitable technique such as by machining, using a cutting tool 32 rotating as shown at 62. As previously mentioned, the selection of the shape and dimensions of the shaped surface 22a may take into consideration variations in the final tool surface 24a resulting from the method used to form the metal sheet 24. As shown in FIG. 7, the metal sheet 24 is placed over the shaped surface 22a and clamped to the base 22.

Referring to FIG. 8, the metal sheet 24 may be formed into the desired shape by a technique commonly known as "incremental sheet forming", also sometimes referred to as stylus NC forming, that is based on localized plastic deformation in a sheet metal blank using a forming tool 30 having a spherical stylus 30a. In the illustrated example, the edges 24b of the metal sheet 24 are clamped or welded on a base 22 so as to maintain edges 24 in substantially a single plane during the incremental sheet forming process. The process of incremental sheet forming is based on a layered manufacturing principle, wherein the model (tool surface 24a) is divided into horizontal slices (not shown). A numerical controlled program 38 (FIG. 3) is prepared using the contours of these slices, and the programmed tool path determines the movement of the forming tool 30. The spherical tip 30a of the tool 30 moves downwardly into contact with the sheet 24, and then draws a contour 25 on a horizontal plane, following which the tool 30 makes a step downward to form the next contour.

FIGS. 9 and 10 show the formation of additional spherical contours 25 in the metal sheet 24. The incremental forming or deformation of the spherical contours in the metal sheet 24 continue until the entire sheet 24 has been formed down onto the shaped surface 22a of the base 22, which acts as a tool surface during the forming process, as shown in FIG. 11.

Figure 12:
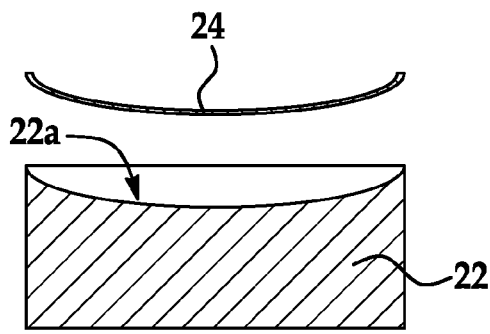
Figure 13:
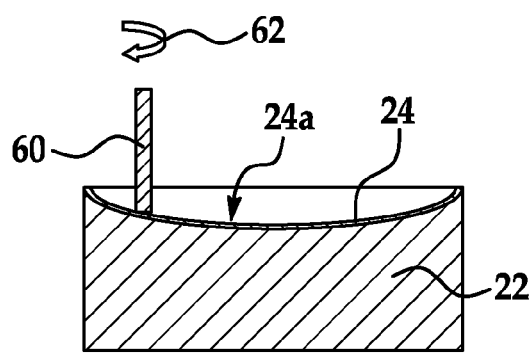
Figure 14:
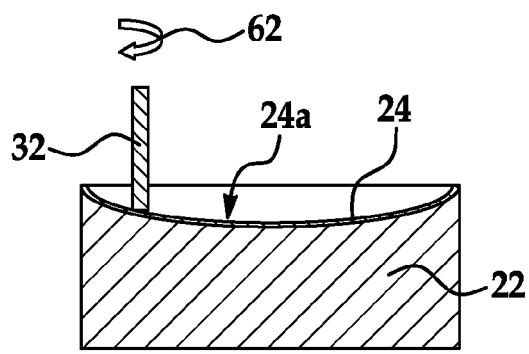

Next, as shown in FIG. 12, the formed metal sheet 24 is removed and the shaped surface 22a of the base 22 may be machined to final surface dimensions. Where the edges of the metal sheet 24 have been welded rather than clamped to the base 22, the welds may be machined away to release the sheet 24 from the base 22. Then, as shown in FIG. 13, the formed metal sheet 24 is replaced on the base 22 and friction plug welding is performed using a tool 60 rotating as shown at 62 in order to attach the metal sheet 24 to the base 22. Friction plug welding involves the use of a tool (not shown) to spin a machined plug (not shown) and force the spinning plug into a hole (not shown) that passes through the metal sheet 24 and the base 22. The friction generated as the plug is forced into the hole creates heat that plasticizes both the plug and base material. The tool torque driving the plug is removed and the plug comes to a stop. The force driving the plug into the material (base 22 and sheet 24) is maintained so that the plug is forge welded to the base material. Other techniques may be used to attach the formed metal sheet 24 to the base 22, including friction stir welding a combination of butt and lap joints between the sheet 24 and the base 22. Optionally, as shown in FIG. 14, the tool surface 24a may be further finished to improve its surface finish or refine its contour using a suitable machine tool 38 rotating as shown at 62.

Figure 15:
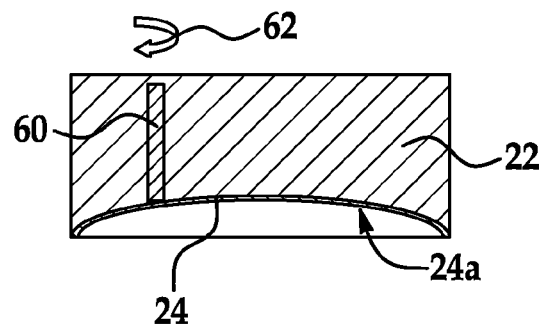

FIG. 15 illustrates an alternate technique for attaching the formed metal sheet 24 to the base 22. In this example, the metal sheet 24 and base 22 are flipped or inverted while remaining indexed on the machine tool table 40 (FIG. 3). Friction plug welding may then be performed from the bottom side of the base 22, i.e. from the side of the base 22 opposite the tool surface 24a.

Figure 16:
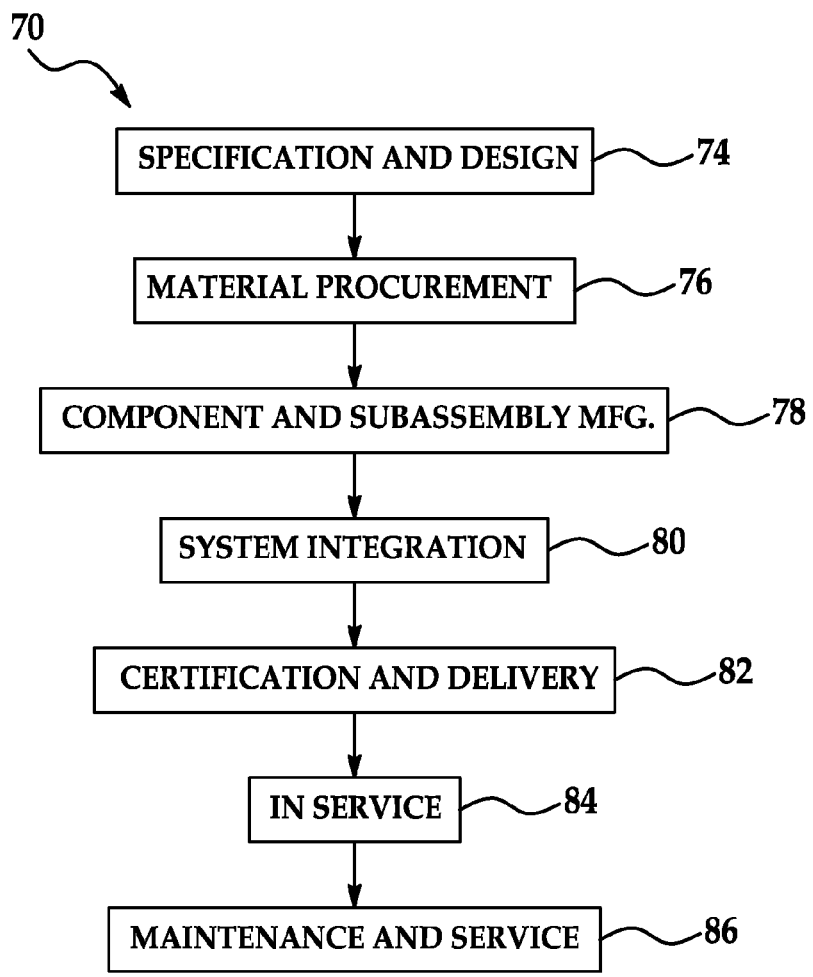
FIG. 16 is an illustration of a flow diagram of aircraft production and service methodology.
Figure 17:
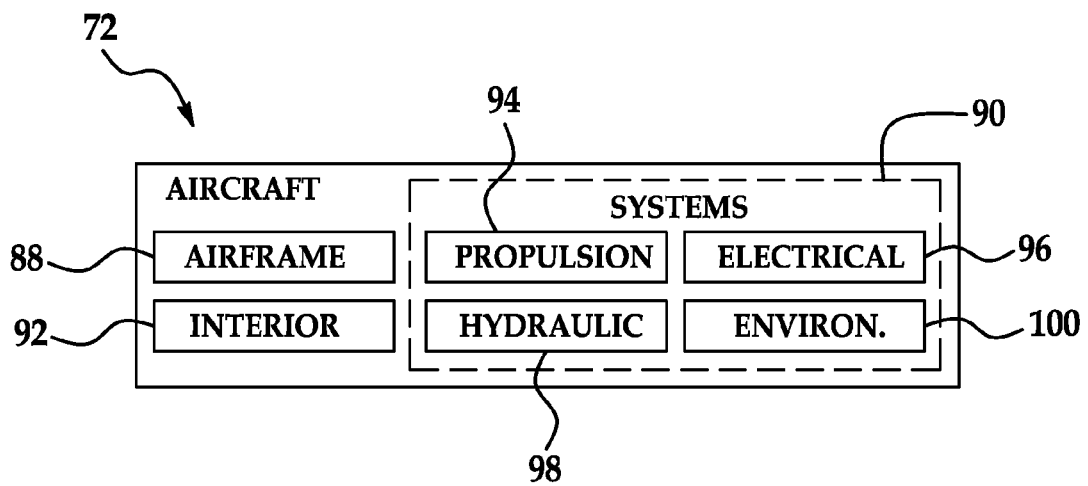
FIG. 17 is an illustration of a block diagram of an aircraft.

Embodiments of the disclosure may find use in a variety of potential applications, particularly in the transportation industry, including for example, aerospace, marine and automotive applications. Thus, referring now to FIGS. 16 and 17, embodiments of the disclosure may be used in the context of an aircraft manufacturing and service method 70 as shown in FIG. 16 and an aircraft 72 as shown in FIG. 17. During pre-production, exemplary method 70 may include specification and design 74 of the aircraft 72 and material procurement 76. The disclosed method may be specified for use in making tools for composite parts during the specification and design 74 of the aircraft 72. During production, component and subassembly manufacturing 78 and system integration 80 of the aircraft 72 takes place. The disclosed method and apparatus may be used to make tools used to manufacture composite parts during the component and subassembly manufacturing process 78. Thereafter, the aircraft 72 may go through certification and delivery 82 in order to be placed in service 84. While in service by a customer, the aircraft 72 is scheduled for routine maintenance and service 86 (which may also include modification, reconfiguration, refurbishment, and so on). Composite parts manufactured using tools made by the disclosed method may be installed on the aircraft 72 during the maintenance and service 86.

Each of the processes of method 70 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 72 produced by exemplary method 70 may include an airframe 88 with a plurality of systems 90 and an interior 92. Composite parts manufactured by tools made by the disclosed method may be used in the airframe 88 and within the interior 92. Examples of high-level systems 90 include one or more of a propulsion system 94, an electrical system 96, a hydraulic system 98, and an environmental system 100. Any number of other systems may be included. Although an aerospace example is shown, the principles of the disclosure may be applied to other industries, such as the marine and automotive industries.

Systems and methods embodied herein may be employed during any one or more of the stages of the production and service method 70. For example, components or subassemblies corresponding to production process 78 may be fabricated using tools made according to the disclosed method while the aircraft 142 is in service. Also, one or more method embodiments may be utilized during the production stages 78 and 80 in order to expedite assembly of or reduce the cost of an aircraft 72. Similarly, one or more of embodiments may be utilized while the aircraft 142 is in service, for example.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of making a tool used in forming a part, comprising:
   shaping a surface on a base to generally match the shape of the part;
   forming a tool surface by incrementally forming the metal sheet onto the shaped surface on the base to create a formed metal sheet;
   removing the formed metal sheet from the shaped surface of the base;
   reshaping the surface of the base to a set of final dimensions after the tool surface has been formed; and,
   attaching the formed metal sheet to the base.

2. The method of claim 1, further comprising:
   filling the base with a material that adds rigidity to the base before the surface of the base is reshaped; and
   removing the filler material from the base after the surface of the base has been reshaped.

3. The method of claim 1, wherein shaping the surface on the base is performed by machining the base.

4. The method of claim 1, wherein incrementally forming the metal sheet includes:
   placing the metal sheet over the shaped surface of the base, and incrementally deforming parts of the metal against the shaped surface of the base sheet.

5. The method of claim 1, wherein the reshaping is performed by machining the shaped surface on the base.

6. The method of claim 1, wherein attaching the metal sheet to the base is performed by friction plug welding the formed metal sheet to the shaped surface on the base.

7. The method of claim 6, further comprising:
   inverting the base, and wherein the friction plug welding is performed from a side of the base opposite of the shaped surface of the base.

8. The method of claim 1, wherein the steps of shaping the surface on the base and incrementally forming the metal sheet are performed by a single machine.

9. The method of claim 1, further comprising:
   finishing the tool surface on the shaped metal sheet after the metal sheet has been attached to the base.

10. A method of making a tool used in forming a part, comprising:
   machining a shape into a surface of a base that generally matches the shape into which the part is to be formed;

placing a metal sheet over the shaped surface on the base;

forming the metal sheet over the shaped surface on the base to create a formed metal sheet;

removing the formed metal sheet from the shaped surface on the base;

machining the shaped surface on the base to final dimensions;

placing the formed metal sheet on the base covering the shaped surface on the base; and, attaching the formed metal sheet to the base.

11. The method of claim 10, wherein machining the shape into a surface on the base and forming the metal sheet over the shaped surface is performed by a single numerically controlled machine tool.

12. The method of claim 10, wherein forming the metal sheet over the shaped surface of the base is performed by an incremental forming process.

13. The method of claim 10, wherein the incremental forming includes:

clamping the metal sheet on the base against movement within a plane, and incrementally displacing portions of the metal sheet in a direction generally perpendicular to the plane.

14. The method of claim 10, wherein machining the shape into a surface on the base includes selecting dimensions for the shape that allow for spring-back of the metal sheet.

15. The method of claim 10, wherein attaching the formed metal sheet to the base is performed by friction plug welding the metal sheet to the base.

16. The method of claim 15, further comprising:

finishing the tool surface of the formed metal sheet after the metal sheet has been friction plug welded to the base.

17. The method of claim 10, wherein attaching the formed metal sheet to the base is performed by:

inverting the base and the formed metal sheet, and friction plug welding the metal sheet to the base from the side opposite the shaped surface in the base.

18. A method of making a composite part layup tool, comprising:

clamping a base in a machine tool;

using the machine tool to machine a shape into a surface of a base that approximately matches the shape of a part to be formed by the tool;

placing a metal sheet on the base overlying the shaped surface;

clamping the metal sheet on the base against movement within a plane;

incrementally displacing portions of the metal sheet in a direction generally perpendicular to the plane and down onto the shaped surface to create a formed metal sheet;

removing the formed metal sheet from the shaped surface on the base;

machining the shaped surface to a set of final dimensions;

placing the formed metal sheet on the shaped surface;

inverting the base while maintaining the metal sheet in indexed relationship to the shaped surface on the base; and, friction plug welding the formed metal sheet to the shaped surface of the base from the side of the base opposite the shape surface on the base.

* * * * *